Dec. 22, 1953  E. E. SANDERS ET AL  2,663,158
FROZEN FOOD CABINET
Filed May 22, 1951  2 Sheets-Sheet 1
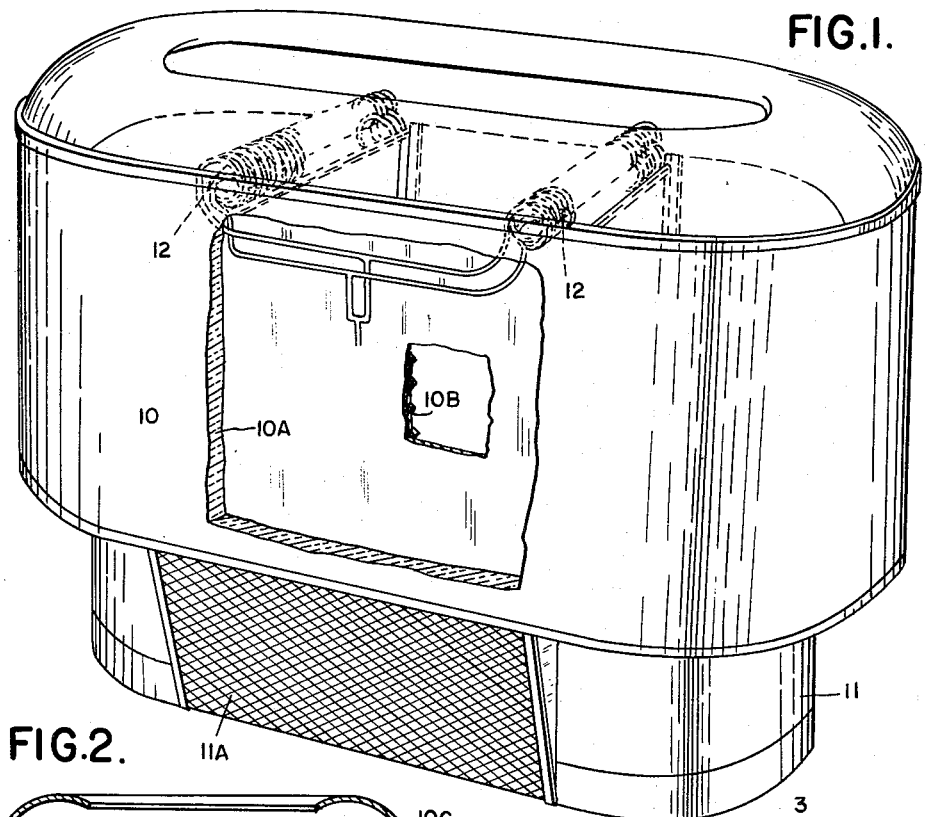
FIG.1.
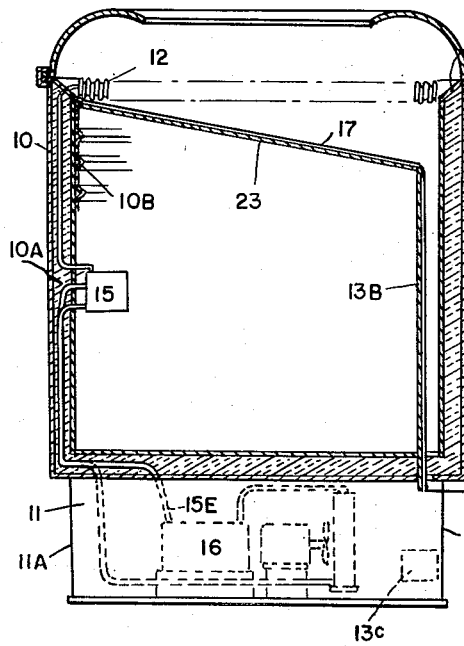
FIG.2.
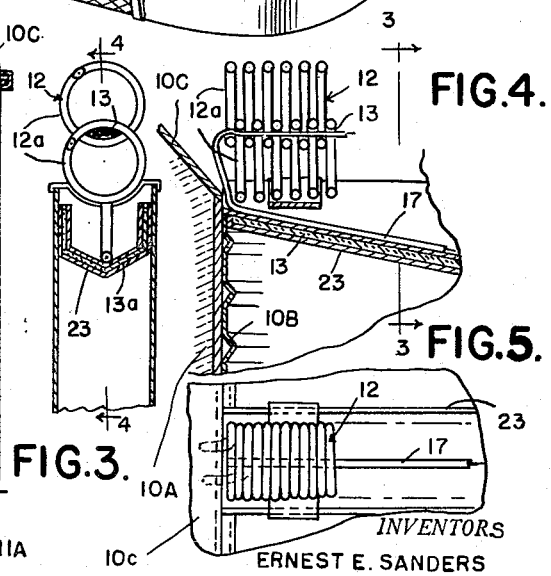
FIG.3. FIG.4. FIG.5.
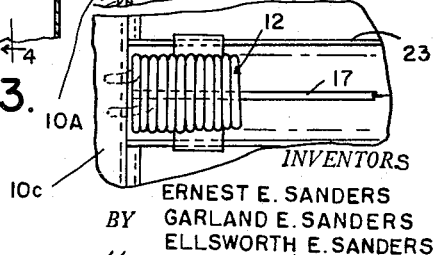
INVENTORS
ERNEST E. SANDERS
BY GARLAND E. SANDERS
ELLSWORTH E. SANDERS
*Hauke + Hardesty*
ATTORNEYS Dec. 22, 1953   E. E. SANDERS ET AL   2,663,158
FROZEN FOOD CABINET Filed May 22, 1951   2 Sheets-Sheet 2

INVENTORS
ERNEST E. SANDERS
BY GARLAND E. SANDERS
ELLSWORTH E. SANDERS

ATTORNEYS

Patented Dec. 22, 1953

2,663,158

UNITED STATES PATENT OFFICE 2,663,158

FROZEN FOOD CABINET

Ernest E. Sanders, Garland E. Sanders, and Ellsworth E. Sanders, Detroit, Mich.

Application May 22, 1951, Serial No. 227,692

6 Claims. (Cl. 62—89.5)

The present invention relates to normally open top frozen food cabinets and specifically to such cabinets operable for the storage and dispensing of ice cream.

Among the objects of the invention is a cabinet of the type specified which will not require ice removal except at much longer intervals than is the case with presently known cabinets.

Another object is to provide means for dehydrating air entering the food space.

Still another object is to provide means for defrosting the dehydrating means and eliminating the water produced by such defrosting.

Still other objects will readily occur to those skilled in the art upon reference to the following description and the accompanying drawings in which Fig. 1 is a perspective view of the cabinet with parts broken away.

Fig. 2 is a substantially central sectional view of the same.

Fig. 3 is a sectional view of one of the dehydrating coils and its trough on line 3—3 of Fig. 4.

Fig. 4 is a sectional view on line 4—4 of Fig. 3.

Fig. 5 is a plan view of Fig. 4.

Figure 6:
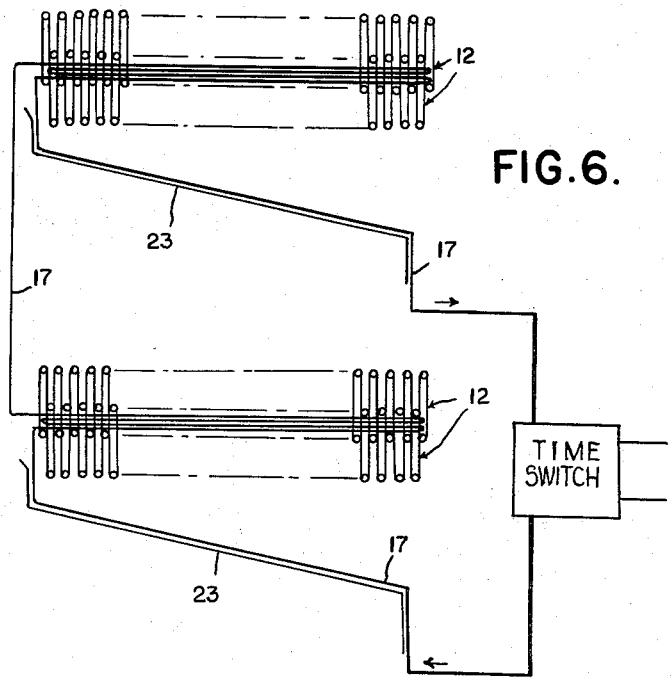
Fig. 6 is a diagrammatic view indicating the heater installation.

As indicated in the drawings, a cabinet involving the present invention consists of an open top food receptacle, preferably covered with a suitable metallic outer sheathing 10, within which is a layer of heat insulating material 10A, this, of course, extending around the sides and in the bottom. The inner wall of the bottom is also preferably sheet metal while the inner side wall and liner 10B is what is known in the trade as a "plate coil." This consists of two metal plates, one or both of which is provided with ribs, the open sides of which register to form a passage or tube. The plates are welded together between the ribs to prevent intercommunication between the passages and the latter are so arranged that they form a continuous passage or coil, the ends of which are extended to an edge of the sheets so that access to the passage may be had at both ends. A suitable "plate coil" is so bent around the inside of the cabinet that it forms the lining thereof and the ends of the coil connected as will be hereinafter explained.

This liner 10B extends to near the top of the receptacle and the space enclosing the insulation is covered by means of a suitable, non-metallic, poor heat conducting plate 10c. This receptacle is mounted upon a suitable pedestal 11 in which is housed the compressor-condenser unit, suitable grating 11a being provided to allow air circulation therethrough.

As shown, the receptacle is preferably greater in length than in width and mounted within the open top thereof and extending transversely are one or more dehydration coils 12, two being shown, but cabinets using one or three or more are in contemplation.

These coils 12 are preferably of the form shown in Figs. 3 to 5 and 7 and consist of a pair of intertwined helices 12a having their axes spaced and substantially parallel, the spacing being somewhat less than the diameter of a helix so as to produce a small, longitudinal passage 13 common to both helices. The coils 12a are connected at one end so as to form them into one continuous coil. The coils 12 are mounted transversely of the receptacle and between levels of the top edges of the outer and inner surfaces of the side wall of the receptacle, and extending across the open end thereof.

Mounted within the receptacle and supporting the coils 12 are a pair of troughs 23 having inclined V-shaped bottoms and provided with heat insulation means 13a. At the lower end of each trough 13 a small tube or pipe 13b extends down to and through the bottom of the receptacle and opposite the tube is a small tray 13C adapted to receive any water running down during defrosting.

Figure 7:
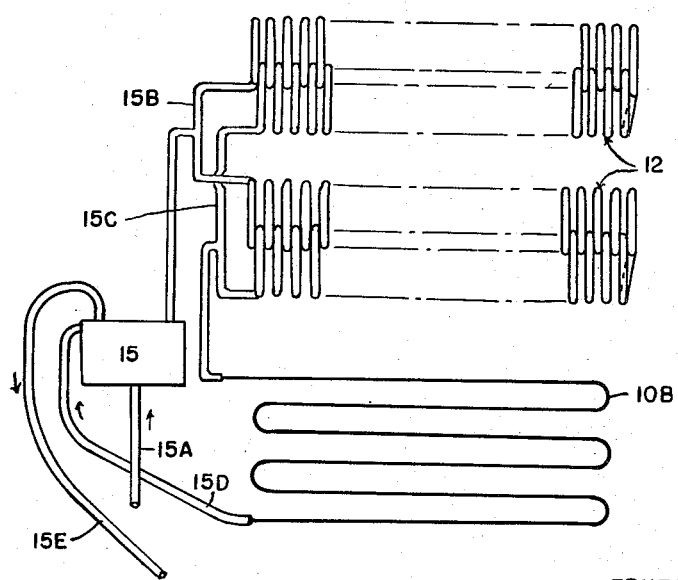
Fig. 7 is a diagrammatic view indicating the coil installation.

In Fig. 7 there is shown diagrammatically the refrigeration circuit for the cabinet. In this figure there is shown conventionally an expansion valve 15 to which refrigerant is led through the conduit 15A from the condenser-compressor unit indicated as a whole at 16. From the valve 15 the refrigerant flows to a header 15B from which it flows to the coils 12. At the other end of the coils 12 is a second header 15C which collects the refrigerant and leads it to one end of the liner coil 10B. The other end of the latter is connected through a conduit 15D to the control side of the valve 15 from which a conduit 15E leads to the suction side of the compressor of unit 16.

In Fig. 6 there is shown diagrammatically the heater circuit for defrosting coils 12. In this figure, a continuous electric heater 17 of well known construction is indicated, these heaters consisting of a resistance heated element enclosed in a flexible insulating covering to produce a filament resembling a wire of small diameter.

As indicated, a suitable length of such heater is passed up through one of the drain tubes 13B and lies in the V-bottom of the trough 23 where it is arranged to lie in the small longitudinal passage 13 common to the two helices of the coil 12. It is preferably looped back upon itself so that four strands of the heater lie in the passage.

The heater element is then extended to the other coil 12 in which it is mounted in the same fashion. The end portion is then led down along the V-bottom of the second trough and down through its drain. The two ends of the heater element are of course arranged to be connected to a suitable electric current supply.

As indicated in Fig. 2, the water receiving vessel 13C may be so located that warm air from the condenser will be passed over it to evaporate the water.

The controls for the cabinet may be the conventional temperature control, operating the unit 16 whenever necessary to maintain the desired temperature in the food receptacle. Such operation must of course maintain both the liner and the coils 12 at quite a low temperature for the preservation of 0° F. or below for ice cream.

In operation, therefore, and with the coils so located that air entering the receptacle reaches them first, they collect a layer of frost rather quickly. Defrosting of the coils 12 at intervals is therefore necessary. For this reason, the heater 17 is used and by means of a suitable timer (not shown) current is supplied to the heater for a sufficient time, at suitable predetermined intervals, to cause the melting of ice from coils 12, while at the same time, disconnecting the unit 16. The water from the melting frost drops down into the trough 23 and is maintained as liquid until it has flowed out of the drain tube.

We claim:

1. A frozen food cabinet having a normally open top and consisting of a heat insulated food receiver having a refrigerating coil lining its vertical walls, an air dehydrating coil extending across the open top of said receiver above the level of said lining and below the top opening, means for selectively defrosting said dehydrating coil, and means for removing the water from said defrosting operation.

2. A frozen food cabinet having a normally open top and consisting of a heat insulated food receiver having a refrigerating coil lining its vertical walls, an air dehydrating coil extending across the open top of said recesses above the level of said lining and below the top opening and means for selectively defrosting said dehydrating coil.

3. A frozen food cabinet having a normally open top and consisting of a heat insulated food receiver having a refrigerating coil lining its vertical walls, an air dehydrating coil extending across the open top of said receiver above the level of said lining and below the top opening, said coils being connected together as a continuous refrigerating coil, means for selectively defrosting said dehydrating coil, and means for removing the water from said defrosting operation.

4. In a frozen food cabinet, a refrigerated well food receiver, an air dehydrating coil located immediately above the level of the well refrigerating means in said well, a heat insulated trough under said coil in position to receive water from said coil when defrosting, said trough having its bottom longitudinally inclined, and heating means extending along said bottom and adjacent said coil.

5. A frozen food cabinet having a normally open top and comprising a heat insulated food receptacle, a refrigerating coil lining for the side walls of said receptacle, a plurality of air dehydrating coils extending transversely of said receptacle above the level of said lining and below the top opening, a header connecting said dehydrating coils at one end, an expansion valve for delivering refrigerant to said header, a second header connecting the other ends of said dehydrating coils and opening to said lining coil, a heater adjacent said dehydrating coils and means for intermittently operating said heater.

6. An air dehydrating coil for frozen food cabinets consisting of a pair of intertwined helical coils connected together at one end thereby providing a continuous coil and having their axes substantially parallel and spaced, the spacing being to a distance less than the diameter of the helix whereby to provide a small longitudinal passage common to both helices, and heating means located in said passage and in contact with both said coils.

ERNEST E. SANDERS.
GARLAND E. SANDERS.
ELLSWORTH E. SANDERS.

References Cited in the file of this patent

UNITED STATES PATENTS

| Number | Name | Date |
|---|---|---|
| 1,878,560 | Wier | Sept. 20, 1936 |
| 2,320,265 | Clerc | May 25, 1943 |
| 2,370,267 | Starr | Feb. 27, 1945 |
| 2,430,329 | Davis | Nov. 4, 1947 |
| 2,483,804 | Brinkoeter | Oct. 4, 1949 |
| 2,490,535 | Minor | Dec. 6, 1949 |
| 2,538,660 | Shreve | Jan. 16, 1951 |